United States Patent [19]
Hammerschlag

[11] 3,789,306
[45] Jan. 29, 1974

[54] APPARATUS FOR DEFINING CONTINUALLY THE ENVELOPE OF THE MAXIMA, THE MINIMA AND/OR MODULATION DEPTH OF A VARYING INPUT SIGNAL

[76] Inventor: Robert Hendrik Hammerschlag, Gezichtslaan 82, Bilthoven, Netherlands

[22] Filed: Sept. 18, 1972

[21] Appl. No.: 290,174

[30] Foreign Application Priority Data
Sept. 20, 1971 Germany............................ 2147532

[52] U.S. Cl.............. 328/150, 307/235 A, 328/135
[51] Int. Cl. ........................................... H03k 5/00
[58] Field of Search 328/135, 150, 151; 307/235 R, 307/235 A

[56] References Cited
UNITED STATES PATENTS

| | | | |
|---|---|---|---|
| 3,524,994 | 8/1970 | Ritter............................ | 328/151 X |
| 3,553,595 | 1/1971 | Walsh............................ | 328/151 |
| 3,588,705 | 6/1971 | Paine............................ | 325/348 |

*Primary Examiner*—John Zazworsky

[57] ABSTRACT

An apparatus for defining continually the envelope of the maxima of a varying input signal, consisting of: a maximum follower, which follows the input signal till a peak is reached and which holds this peak value, and a minimum detector, which gives a logic signal when the input signal has passed a minimum; the said logic signal of the minimum detector introducing the following three actions: firstly the peak value held by the maximum follower is given to a memory element, for example a sample-hold module, the value stored in this memory element being the read-out of the apparatus, secondly the said maximum follower is set back to a zero value and thirdly the maximum follower is released for following the varying input signal in order to measure the next maximum which will replace the previous maximum stored in the memory element when the next minimum is detected by the minimum detector.

The first and second action can be introduced by a maximum detector. Instead of the memory element one can use a second maximum follower in combination with a maximum selector. The envelope of the minima is defined by a similar apparatus. When an apparatus for defining the maxima is combined with an apparatus for defining the minima one gets an apparatus, which can define continually the modulation depth of a varying input signal.

17 Claims, 12 Drawing Figures

Inventor:

Robert Hendrik Hammerschlag

APPARATUS FOR DEFINING CONTINUALLY THE ENVELOPE OF THE MAXIMA, THE MINIMA AND/OR MODULATION DEPTH OF A VARYING INPUT SIGNAL

BACKGROUND OF THE INVENTION

The invention relates to an apparatus for defining the envelopes and the modulation depth of varying signals. This kind of apparatus is used in measuring and information technics to analyze signals, of which the maxima and minima contain the desired information.

A known method for defining the maxima and minima is making a complete trace of the varying signal with the help of a plotter. The maxima and minima can be read from the trace. The envelopes are found by connecting the maxima at one side of the trace and the minima at the other side of the trace. When the variations of the signal are traced so closely that the reciprocating lines touch each other, one finds the envelopes as boundaries between inked and clean paper. Using this method one needs a plotter, which is so fast, that it can follow the varying signal without delay.

A fast plotter is not necessary if one uses an apparatus, which forms the envelopes of the maxima and minima of the varying signal. In the known apparatuses for defining the envelopes the varying signal is fed in to a integrator circuit by way of a rectifier (for example a diode). The integrator circuit consists of a capacitor C and a resistor R in parallel to it. The product R·C must be chosen in such a way, that the variations of the varying input signal are damped sufficiently, but the variations in the envelopes are not damped. With this method an accurate measurement of the envelopes is only possible, if the variations of the input signal are of a much higher frequency than the variations on the envelopes.

The invention provides an apparatus, which is able to define continually the envelopes when there is only a relatively slight difference between the frequency of the variations of the input signal and the frequency of the variations of the envelopes. The apparatus also defines the envelopes, when there is a wide range in the frequency of the variations of the input signal. A sine shape of the variations in the input signal is not required for the apparatus. This is of interest for various applications in optics, where often signals occur which have no sine shape.

SUMMARY OF THE INVENTION

The basic and simplest version of the invention is an apparatus for defining continually the envelope of the maxima of a varying input signal consisting of a maximum follower, which follows the input signal till a peak is reached and which holds this peak value, and a minimum detector, which gives a logic signal when the varying input signal has passed a minimum. The logic signal of the minimum detector introduces the following three actions: Firstly the peak value held by the maximum follower is entered into a memory element, for example a sample-hold module, the value stored in this memory element being the read-out of the apparatus. Secondly the said maximum follower is set back to a zero value. And thirdly the maximum follower is released for following the varying input signal in order to measure the next maximum, which will replace the previous maximum stored in the memory element when the next minimum is detected by the minimum detector.

The apparatus described in the last paragraph has the disadvantage, that the next maximum is not stored in the memory element until the next minimum has been detected. The next maximum value can be stored in the memory element immediately after the maximum has occured, if the apparatus also posesses a maximum detector, which gives a logic signal, when the input signal has passed a maximum. This logic signal introduces, that the peak value held by the maximum follower is given to the memory element. The resetting to a zero value of the maximum follower may be introduced by the logic signal of the maximum detector or by the logic signal of the minimum detector. The logic signal of the minimum detector again introduces the release of the maximum follower.

The apparatuses described in the foregoing two paragraphs can be formed without the memory element and having instead a second maximum follower and a maximum selector, the latter choosing the highest value from the output values of the two maximum followers and giving this as the read-out. The logic signal of the minimum detector now sets back and releases for following the input signal the first maximum follower at one minimum and the second maximum follower at the next minimum alternately. The resetting of the maximum followers may be introduced alternative by a maximum detector.

The apparatuses described in the last three paragraphs can be converted to define continually the envelope of the minima of a varying input signal by replacing a maximum follower with a minimum follower, a minimum detector with a maximum detector, a maximum detector with a minimum detector and a maximum selector with a minimum selector.

A seocnd possibility to convert the apparatus to define the envelope of the minima consists of placing a signal invertor at the input and a signal invertor at the output of the apparatus, which defines the envelope of the maxima. In the same way an apparatus for defining the envelope of the minima can be converted to define the envelope of the maxima.

An apparatus for defining the envelopes of both maxima and minima is formed by a combination of an apparatus, which defines the envelope of the maxima and an apparatus which defines the envelope of the minima. The minimum detector and/or maximum detector are used commonly, where these are used both for defining the envelope of the maxima and minima.

A mathematical combination of the maxima and minima of a varying input signal, for example the modulation depth defined as maximum minus minimum divided by maximum plus minimum, is formed, when an apparatus for defining the envelopes of the maxima and the minima is followed by a calculating element, which executes the said mathematical operation with the envelopes.

If the apparatus, which defines the envelopes of the maxima and the minima, is of the kind having two memory elements, sending their output signals to the calculating element, then one memory element can be omitted, the calculating element can be placed before the memory element and processes directly the signals from the maximum follower and the minimum follower. The value in the memory element is updated by the logic signal of the minimum detector or the maximum detector just before the maximum and/or minimum follower are set back to a zero value by the same logic signal, the value in the memory element being the output of the apparatus.

A simple way to realise the said maximum detector is the use of a comparator, which compares the varying input signal with the value at the output of a maximum follower, which follows the input signal and holds the maximum value reached. If there is in the apparatus already a maximum follower it is possible to use this maximum follower. The comparator gives different logic signals, when the output of the maximum follower is equeal to the input signal and when the output of the maximum follower is higher than the input signal. In the same way a minimum detector is built. An adjustable positive feed back from the output to the input of the comparator eliminates the influence of high frequency noise on the switching process in the comparator. The maximum detector as described may be incorporated in a maximum follower, which consists of a capacitor, which is charged over a diode by the output of a comparator, which compares the signal over the capacitor with the varying input signal, the comparator possessing a feed back circuit with a diode, this feed back circuit being in action as long as the capacitor has to be charged in order to follow the varying input signal in a stable manner without overshoot, but when the peak value is reached by the input signal, the diode in the said feed back circuit prevents any current through the feed back circuit and the comparator gives its normal high level signal. In the same way a minimum detector may be incorporated in a minimum follower.

If the varying input signal passes a predetermined signal value between each maximum and minimum, then a comparator, which gives a logic signal, when the input signal passes the predetermined signal value, may be used instead of a maximum and/or minimum detector. A possible device for defining a predetermined signal value is a low pass filter, fed at its input by the varying input signal. This low pass filter does not allow the rapid variations of the input signal to pass, but gives at its output the average value of the varying input signal, which is used as the predetermined signal value.

A further possible maximum detector consists of a differentiator and a zero crossing comparator, which gives a logic signal when the output signal of the differentiator crosses zero downwards. A minimum detector is formed by a differentiator and a zero crossing comparator, which gives a logic signal when the output signal of the differentiator crosses zero upwards.

The varying input signal may contain undesired high frequency noise, as is the case in a signal coming from a photo-detector. Then it is necessary to place a low pass filter before the described apparatus for defining the envelopes, which allows only the range of frequencies belonging to the varying signal to pass, in order to eliminate the undesired noise.

DESCRIPTION OF THE PREFERRED EMBODIMENTS

Figure 1:
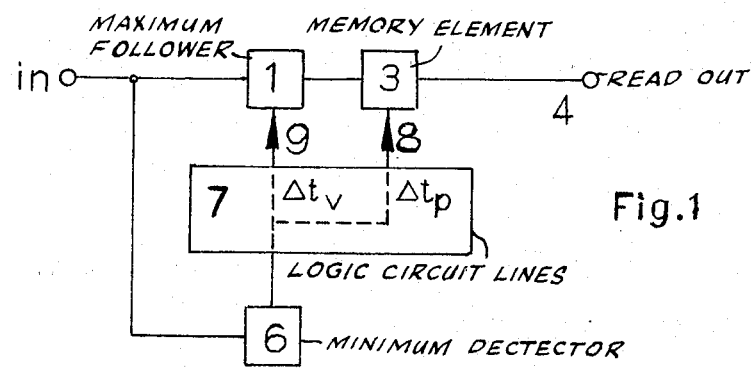
FIG. 1 is a schematic block diagram of an apparatus for defining the envelope of the maxima of a varying input signal.

Referring now to the drawings, in FIG. 1 the maximum follower 1 follows the input signal till a peak is reached and holds this peak value, the minimum detector 6 gives a logic signal when the input signal has passed a minimum, the said logic signal of the minimum detector 6 introduces the following three actions by way of the circuit lines 7: Firstly the peak value held by the maximum follower 1 is conducted to a memory element 3, for example a sample hold module, which is in the sample mode during a pulse signal $\Delta t_p$, which is given through the line 8. Secondly the maximum follower 1 is set back to a zero value, for example by a signal which comes through the line 9 the time $\Delta t_v$ after the minimum detector detects the minimum, $\Delta t_v$ being longer than $\Delta t_p$. And thirdly the maximum follower 1 is released when the signal retarded by $\Delta t_v$ on line 9 returns to its initial value. Now the maximum follower 1 follows again the varying input signal in order to measure the next maximum, which will replace the previous maximum stored in the memory element 3 when the next minimum is detected by the minimum detector. The value stored in the memory element 3 is the readout 4 of the apparatus.

Figure 2:
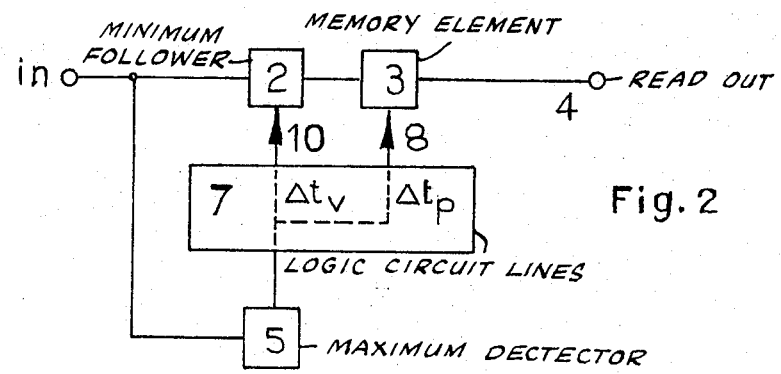
FIG. 2 is a schematic block diagram of an apparatus for defining the envelope of the minima of a varying input signal.

The apparatus for defining the envelope of the minima of FIG. 2 works in the same manner as the apparatus of FIG. 1, only the maximum follower 1 is replaced by a minimum follower 2 with a logic input line 10 instead of 9, and the minimum detector 6 is replaced by a maximum detector 5.

Figure 3:
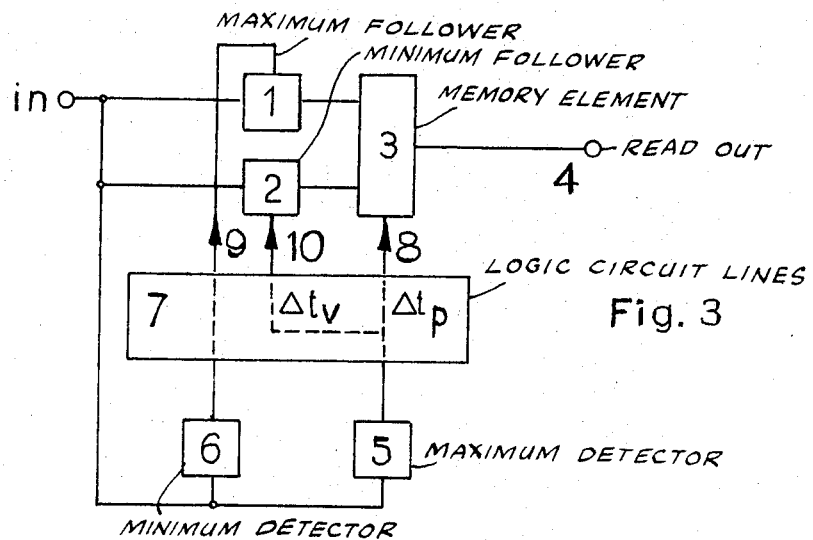
FIG. 3 is a schematic block diagram of an apparatus for defining the envelopes of the maxima and minima and/or of a mathematical combination of the minima and maxima of a varying input signal.

FIG. 3 shows the block diagram of an apparatus, which can define the envelopes of maxima, minima and/or a mathematical combination of maxima and minima. The apparatus is a combination of the apparatuses of FIGS. 1 and 2. The reference numerals designate similar parts as in the FIGS. 1 and 2. The calculating element, which forms the mathematical combination of maxima and minima, is incorporated in the memory block 3.

Figure 4:
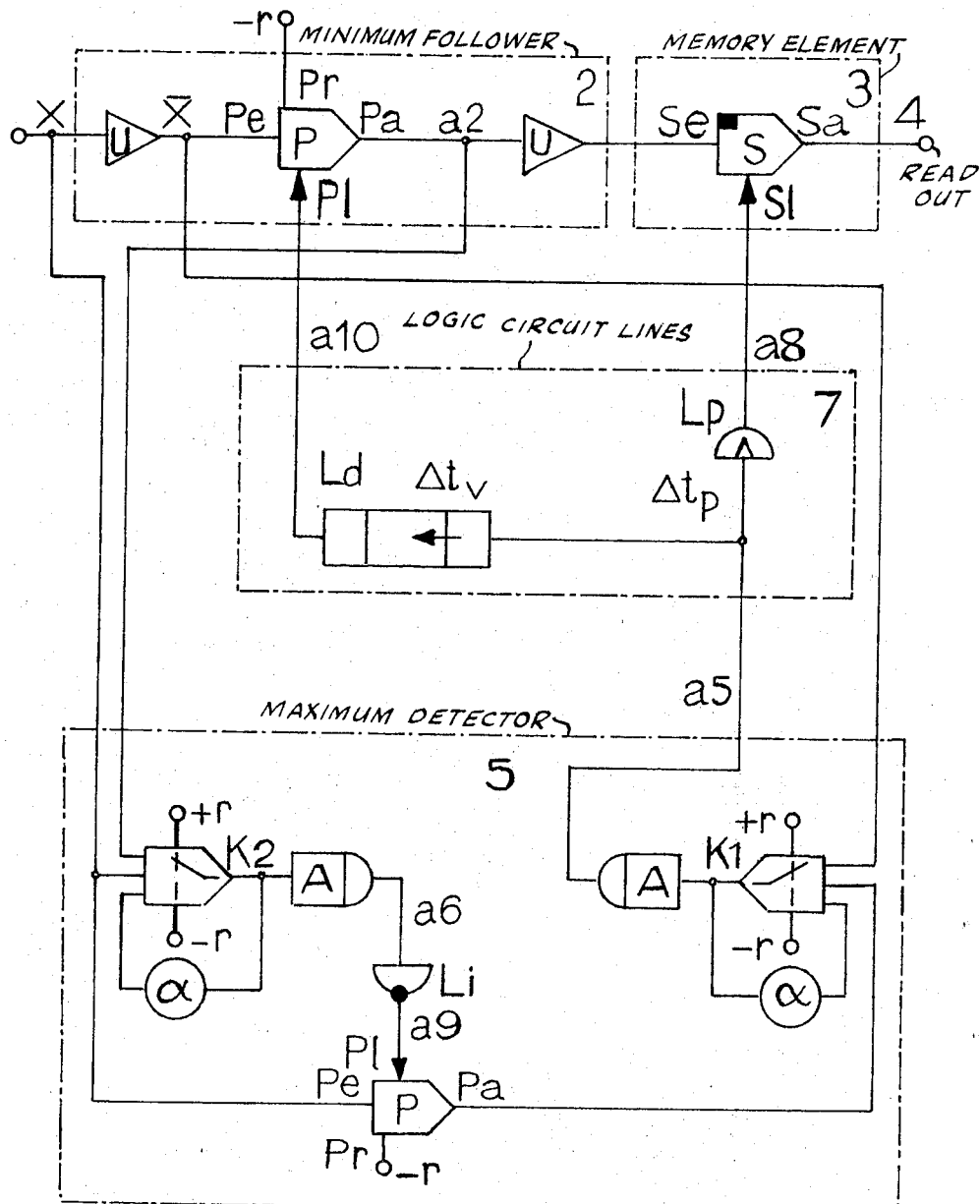
FIG. 4 is a circuit diagram of an apparatus for defining the envelope of the minima of a varying input signal occording to the block diagram of FIG. 2.
Figure 5:
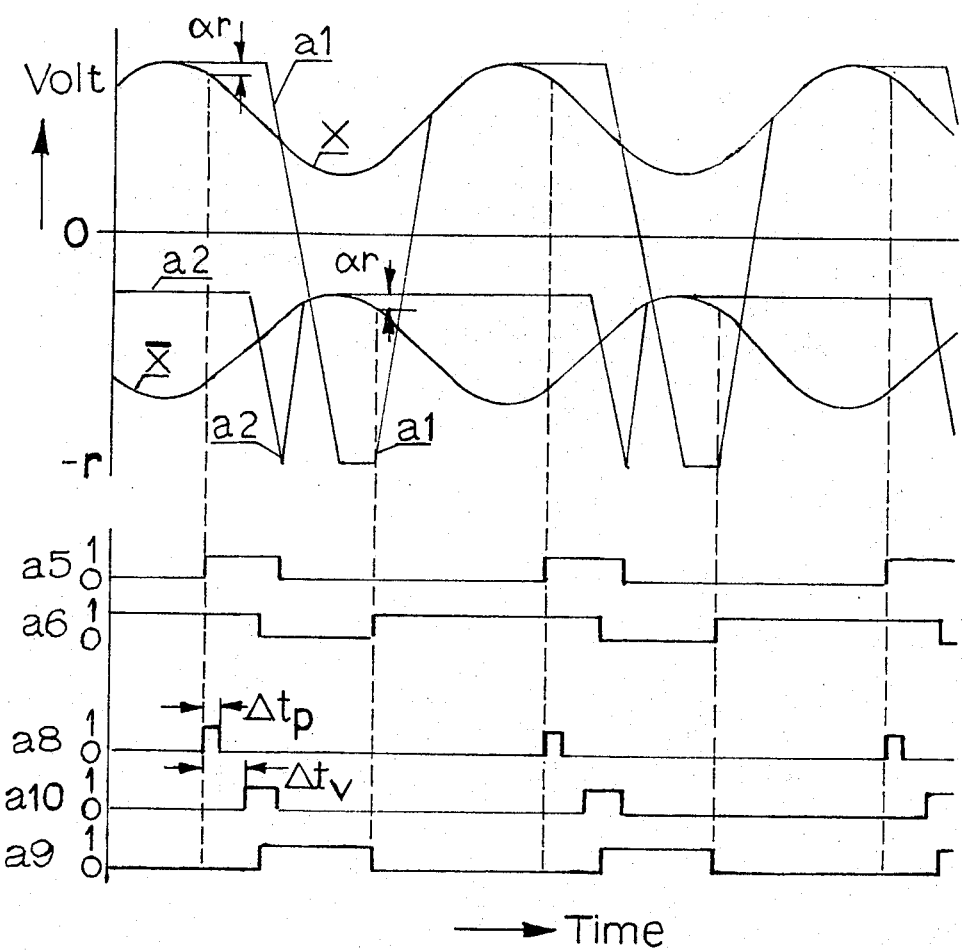
FIG. 5 gives explanatory curves relating to the operation of the circuit as shown in FIG. 4.

In FIG. 4 is shown a detailed circuit diagram of the block diagram of FIG. 2. FIG. 5 gives explanatory curves relating to the operation of the circuit of FIG.

4. The minimum follower 2 consists of a maximum follower P preceded and followed by an invertor U. The minima of the varying input signal $x$ become the maxima of the inverted input signal $\bar{x}$, as can be seen in FIG. 5. The said element P follows the signal at the input P$e$ till a peak is reached and holds this peak value. When a logic signal "1" is at the logic input P1, then the signal at the output P$a$ is set back to the zero value $-r$, present at the initial condition input P$r$. The memory element 3 is a sample-hold module S which gives at its output S$a$ a value equal to the value at its input S$e$ as long as there is a logic signal "1" at its logic input S1. After the signal at the logic input S1 has switched from "1" to "0", the signal at the output S$a$ remains constant at the value, which was present at the input S$a$ at the moment of switching of the logic signal from "1" to "0". Elements like P and S in itself are known and a detailed circuit description of these elements can be found on page 43 of the "Handbook and catalog of operational amplifiers 1969" from Burr Brown Research Corporation, Tucson, Arizona, but the application of these elements in a apparatus as described in this specification is not known. The maximum detector 5 consists of a comparator K1 followed by Analog-Digital Switch A with output signal $a5$, which is "0" when the sum of the input signals at the comparator is negative, and is "1" when the said sum is positive. The comparator possesses an adjustable positive feedback from its output to its input through the attenuator $\alpha$. The positive feedback guarantees a stable switching process. The attenuator $\alpha$ allows an adaptation to the noise level. The said comparator K1 compares the values of the inverted varying input signal $\bar{x}$ and the signal $a1$ at the output of a maximum follower P fed by the varying input signal $x$. The reset signal $a9$ for this maximum follower P is given by a second comparator K2 followed by a analog-digital switch A and an invertor L$i$, which inverts the logic signal $a6$ into the signal $a9$. The second comparator K2 compares the input signals $x$ and $a2$, and has a positive feed back through an attenuator $\alpha$ in order to eliminate the influence of noise. The pulse element L$p$ gives a pulse of length $\Delta t_p$ when the signal $a5$ changes from "0" to "1". The delay element L$d$ delays over a time $\Delta t_v$ the change of the signal $a5$ from "0" to "1". The cycle between two maxima runs on as follows: The signal $a5$ switches from "0" to "1" when the first comparator K1 detects, that the varying input signal $x$ has reached a maximum. Signal $a8$ gives an "1" pulse of the length $\Delta t_p$ to the sample-hold module S of the memory element 3. The last minimum value present at the output of the minimum follower 2 is stored in S and is given to the output 4. After a time $\Delta t_v$ the signal $a10$ changes from "0" to "1". The signal $a2$ is set back to a zero value $-r$. The signal $a6$ changes from "1" to "0" when the sum of the signals $a2$, $x$ and $\alpha r$ at the input of the second comparator K2 becomes negative. Then signal $a9$ changes from "0" to "1" and as a consequence signal $a1$ is set back to the zero value $-r$. Now the sum of the signals $a1$, $\bar{x}$ and $\alpha r$ becomes negative and the signal $a5$ changes from "1" to "0". Then signal $a10$ changes from "1" to "0". The signal $a6$ changes from "0" to "1" when the second comparator K2 detects, the the varying input signal $x$ has reached a minimum. Signal $a9$ changes from "1" to "0", releases the maximum follower P with output signal $a1$, which follows the signal $x$ till the next maximum is reached. Then the cycle starts anew.

The apparatus explained with the help of FIGS. 4 and 5 can also be used for defining continually a mathematical combination of the maxima and minima of a varying input signal $x$ with only little change of the circuit. The signals $a2$ and $a1$ are conducted to an element F (see FIG. 6), which forms the mathematical combination of maximum and minimum. The memory element is not fed by the output of the minimum follower 2 but by the output of the element F. In order to make this new circuit conform the block diagram of FIG. 3, the maximum detector 5 of FIG. 4 is split up into the following seperated blocks: a maximum follower 1 consisting of the element P, a minimum detector 6 consisting of K2 plus its A–D switch A and the remaining maximum detector 5 consisting of K1 plus its A–D switch A. The logic invertor L$i$ is added to the logic circuit lines 7. The cycle between two maxima runs exactly the same as in the circuit of FIG. 4. So the explanatory curves of FIG. 5 are also valid for the circuit of FIG. 6.

Figure 6:
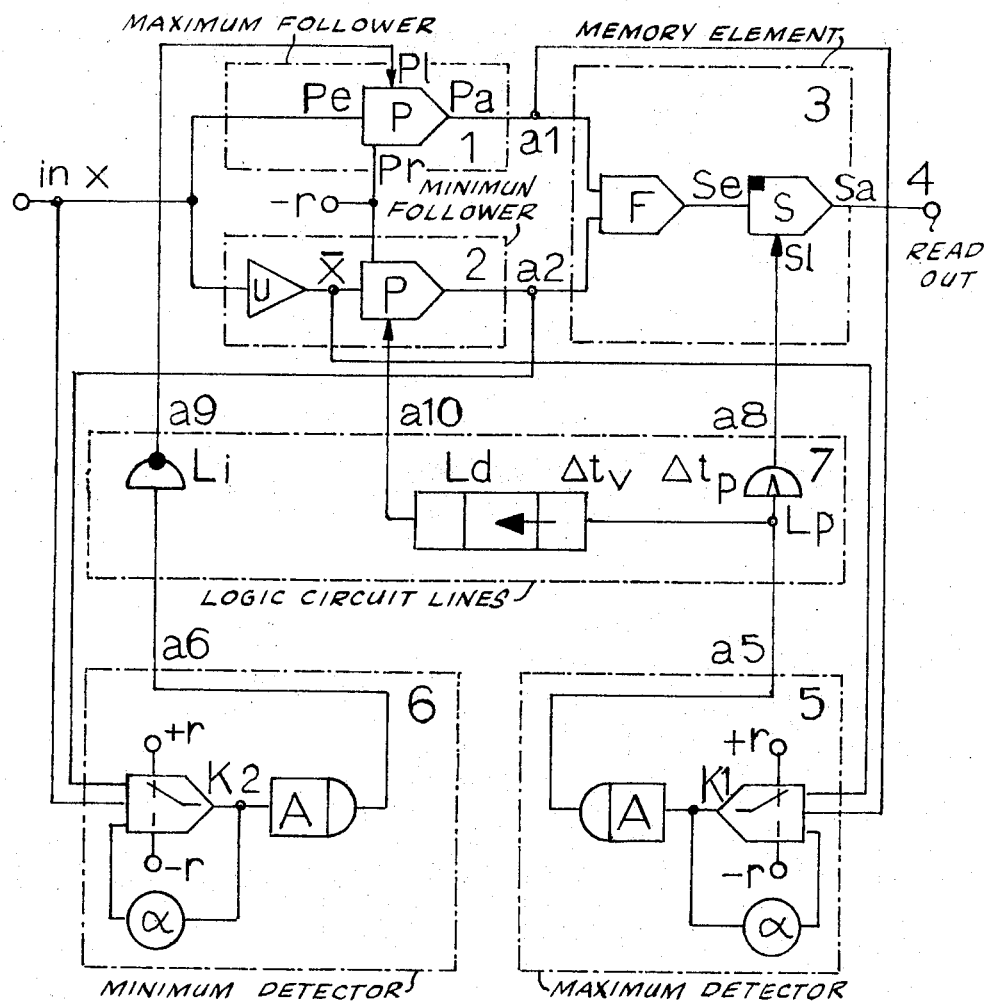
FIG. 6 is a circuit diagram of an apparatus for defining a mathematical combination of the minima and maxima of a varying input signal according to the block diagram of FIG. 3.
Figure 7:
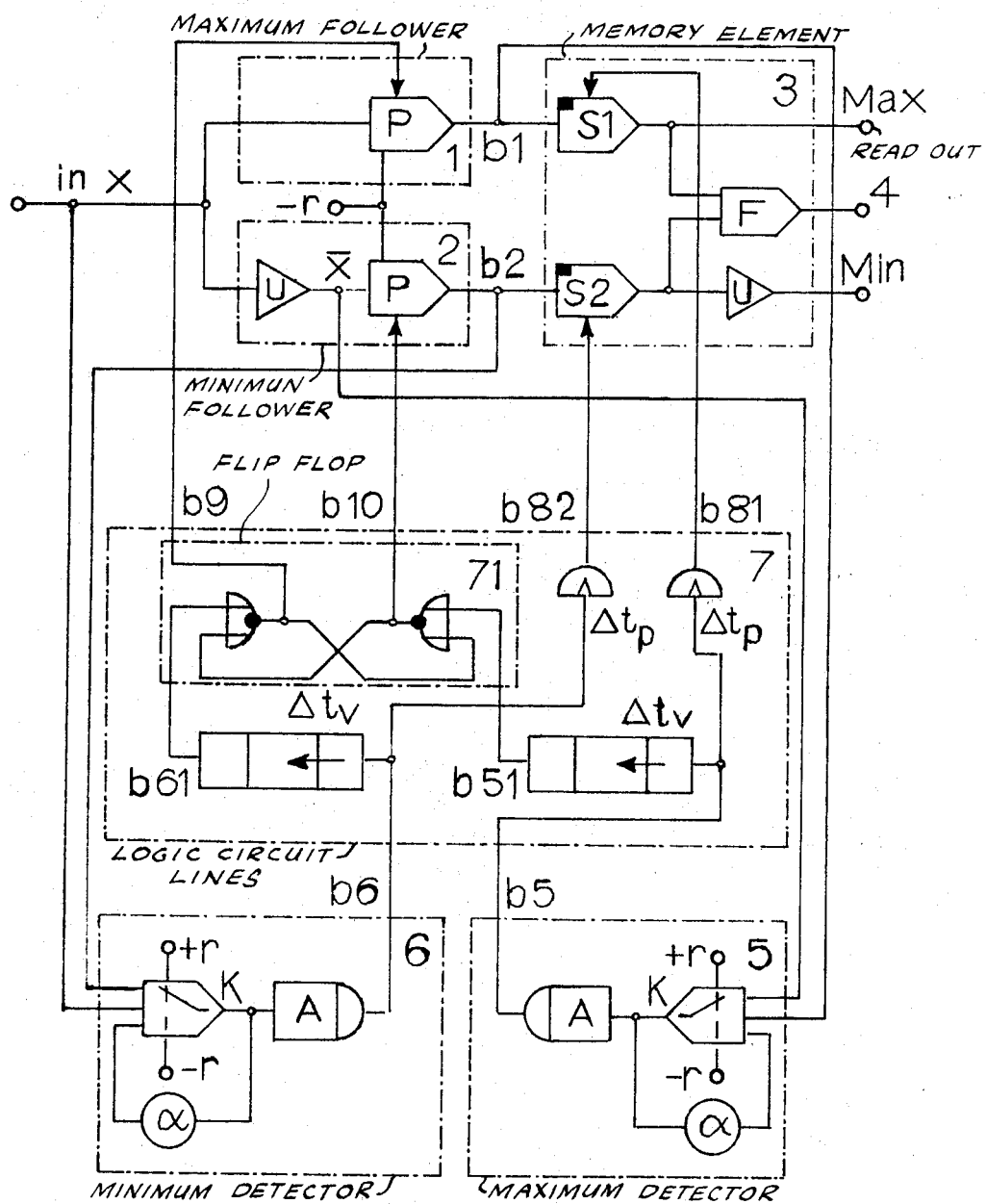
FIGS. 7 and 9 are circuit diagrams of an apparatus for defining the envelopes of the maxima and minima and a mathematical combination of the envelopes according to the block diagram of FIG. 3.
Figure 8:
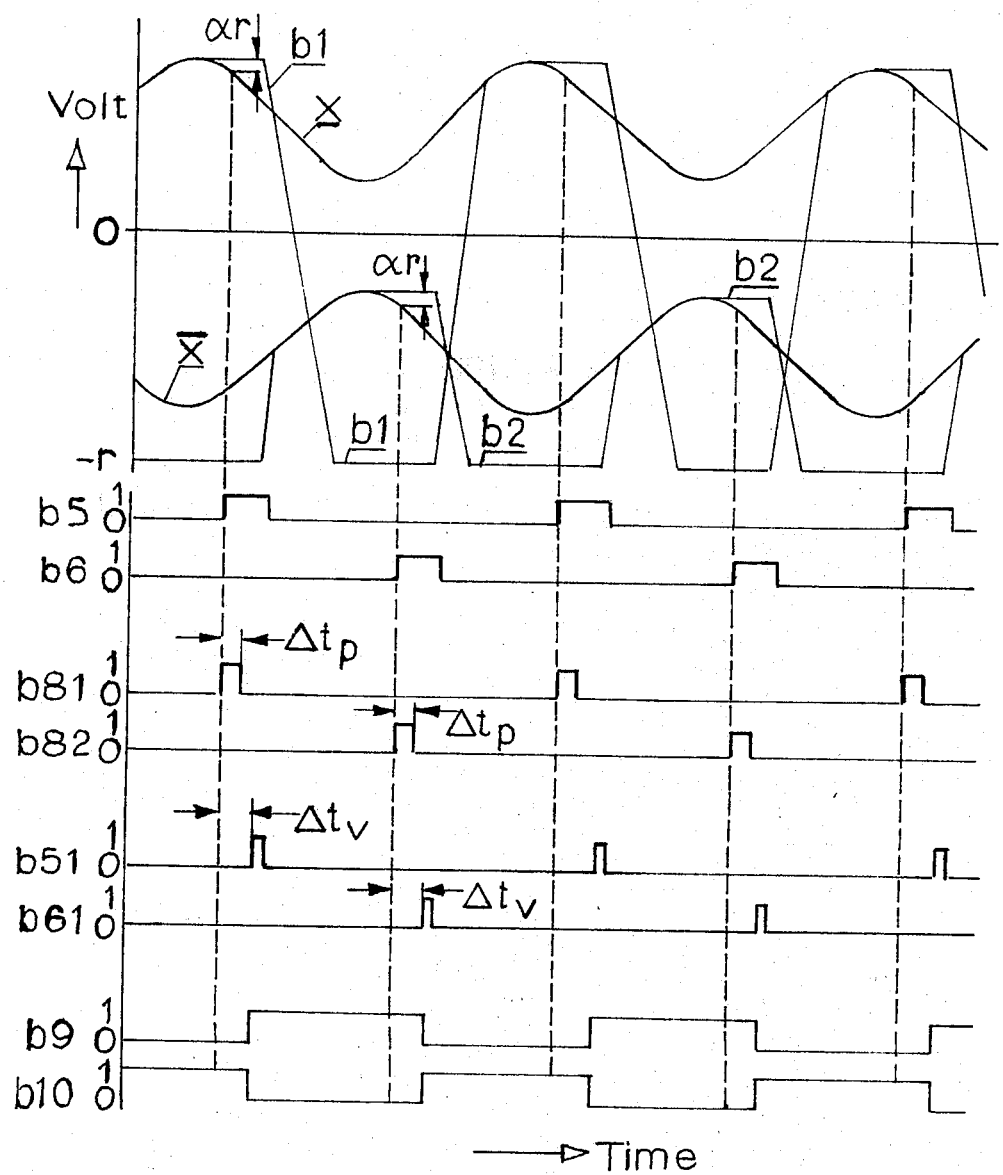
FIG. 8 gives explanatory curves relating to the operation of the circuit diagram of FIG. 7.

A second embodiment of an apparatus for defining the envelopes of maxima and minima and a mathematical combination of the maxima and minima is shown in FIGS. 7 and 8. The maximum follower 1, the minimum follower 2, the maximum detector 5 and the minimum detector 6 consist of the same elements as in the circuit of FIG. 6. In the memory element 3 are two sample-hold modules S1 and S2, which make possible a continually read-out of the envelopes of the maxima and of the minima at the outputs indicated by Max and Min. The output 4 gives a mathematical combination of the envelopes of maxima and minima, which is formed by the element F. The logic signal lines 7 and the operation cycle are slightly different. The cycle from maximum to maximum runs as illustrated in FIG. 8: The signal $b5$ changes from "0" to "1" when the maximum detector 5 detects that the sum of the signals $\bar{x}$, $b1$ and $-\alpha r$ becomes positive. The signal $b81$ gives a pulse "1" with length $\Delta t_p$ to the sample-hold module S1 and the last maximum is stored in S1. After a time $\Delta t_v$ the signal $b51$ changes from "0" to "1". The flip-flop 71 switches over. The signal $b9$ changes from "0" to "1" and the signal $b1$ is set back to the zero value $-r$. The sum of the signals $b1$, $\bar{x}$ and $\alpha r$ becomes negative and signal $b5$ changes from "1" to "0". The inverted output $b10$ of the flip-flop 71 changes from "1" to "0" and releases the element P in the minimum follower 2, and the signal $b2$ follows the signal $x$ till $x$ reaches a minimum. The logic signal $b6$ changes from "0" to "1", when the minimum detector 6 detects that the sum $b2$, $x$ and $-\alpha r$ becomes positive. The signal $b82$ gives a pulse "1" with length $\Delta t_p$ to the sample-hold module S2, and the last minimum is stored in S2. After a time $\Delta t_v$ the signal $b61$ changes from "0" to "1". The flip-flop 71 switches over. The signal $b10$ changes from "0" to "1" and the signal $b2$ is set back to the zero value $-r$. The sum of the signals $b2$, $x$ and $\alpha r$ becomes negative and signal $b6$ changes from "1" to "0". The signal $b9$ of the flip-flop 71 changes from "1" to "0" and releases the element P in the maximum follower 1, and the signal $b1$ follows the signal $x$ till $x$ reaches the next maximum. Now the cycle starts anew. The advantages of this circuit relative to the circuit of FIG. 6 are an immediate storage of a new minimum in S2 and a longer time for the resetting of the minimum follower 2 as can be seen from signal $a2$ in FIG. 5 and signal $b2$ in FIG. 6.

Figure 9:
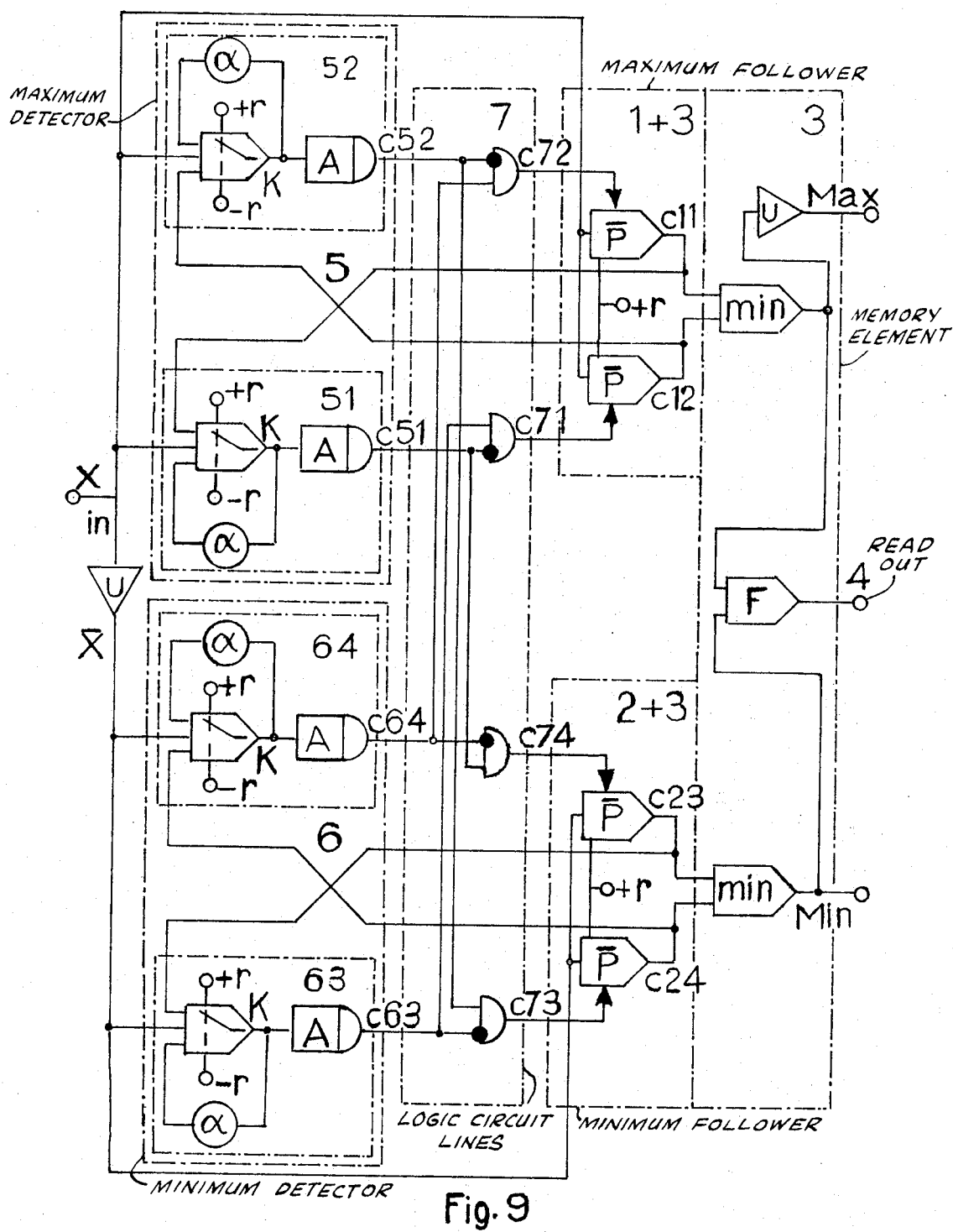
Figure 10:
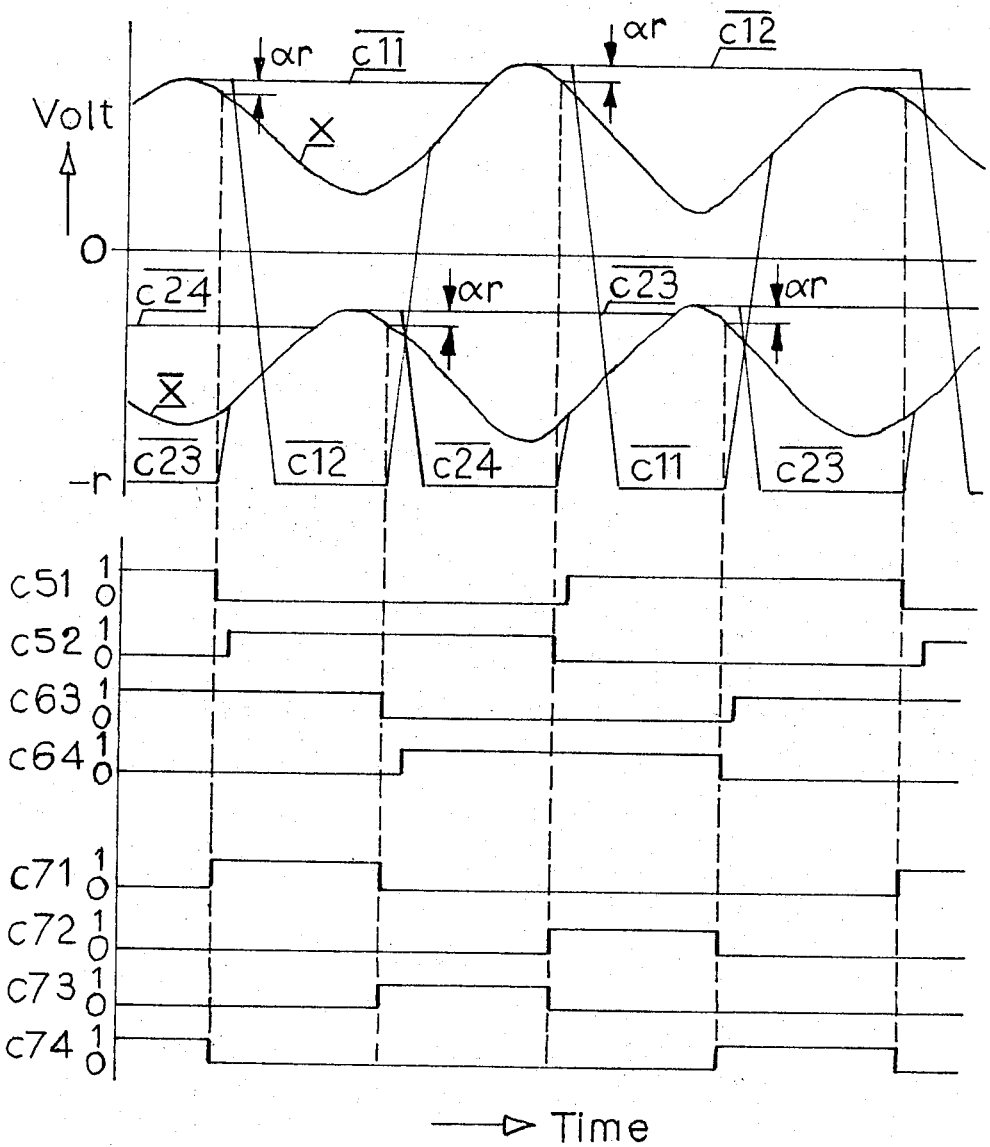
FIG. 10 are explanatory curves relating to the operation of the circuit as shown in FIG. 9.

A third embodiment of the apparatus for defining the envelopes of maximum and minimum and a mathematical combination of maximum and minimum is shown in FIGS. 9 and 10. The element $\overline{P}$ is an inverting maximum follower. It has the function of an element P followed by an invertor. The four $\overline{P}$ elements have not only the function of maximum and minimum follower but also the function of memory elements. Consequently no seperate elements S are necessary. The maximum and minimum detector 5 and 6 contain both two times the circuit of the corresponding detectors 5 and 6 in FIGS. 6 and 7. These parts are indicated by 51, 52 and 61, 62. The minimum selector min chooses the lowest value from the output values of the two elements $\overline{P}$. No logic elements $L_P$ or $L_V$ are used. One cycle covers two periods from maximum to maximum of the varying input signal $x$. This cycle runs as illustrated in FIG. 10. The signal $c$ 51 changes from "1" to "0" when the sum of the signals $x$, $c11$ and $\alpha r$ becomes negative. FIG. 10 does not show the signal $c11$, but the inverted signal $\overline{c11}$. The same applies to $c12$, $c23$, and $c24$. The signal $c71$ changes from "0" to "1", and the signal $c74$ changes from "1" to "0". A possible change of $c52$ when the maximum is higher than the previous maximum has no influence on $c72$ and $c73$ because $c64$ is "0" and $c63$ is "1". The change of $c71$ sets back signal $c12$ to the zero value $+r$. The sum of the signals $c12$, $x$ and $-\alpha r$ becomes positive and the signal $c52$ changes from "0" to "1". The change of $c74$ releases the signal $c23$ from $+r$ and the signal $c23$ follows $x$ till a minimum is reached. The signal $c63$ changes from "1" to "0" when the sum of the signals $\overline{x}$, $c23$ and $\alpha r$ becomes negative. The signal $c73$ changes from "0" to "1" and the signal $c71$ changes from "1" to "0". The change of $c73$ sets back the signal $c24$ to the zero value $+r$. The sum of the signals $c24$, $\overline{x}$ and $-\alpha r$ becomes positive and $c64$ changes from "0" to "1". The change of $c71$ releases signal $c12$ from $+r$ and $c12$ follows $\overline{x}$ till a maximum is reached. Signal $c52$ changes from "1" to "0" when the sum of $x$, $c12$ and $\alpha r$ becomes negative. The signal $c72$ changes from "0" to "1" and the signal $c73$ from "1" to "0". The change of signal $c72$ sets back the signal $c11$ to the zero value $+r$. The sum of the signals $c11$, $x$ and $-\alpha r$ becomes positive and $c51$ changes from "0" to "1". The change of the signal $c73$ releases $c24$ and $c24$ follows $x$ till the next minimum. The signal $c64$ changes from "1" to "0" when the sum of the signals $\overline{x}$, $c24$ and $\alpha r$ becomes negative. The signal $c74$ changes from "0" to "1" and the signal $c72$ from "1" to "0". The change of $c74$ sets back the signal $c23$ to the zero value $+r$. The sum $c23$, $\overline{x}$ and $-\alpha r$ becomes positive and the signal $c63$ changes from "0" to "1". The change of $c72$ releases $c11$ from the value $+r$ and $c11$ follows $\overline{x}$ till the next maximum. Now the cycle starts anew. From the cycle we see, that the elements $\overline{P}$ are alternately used as maximum/minimum follower and memory element.

Figure 11:
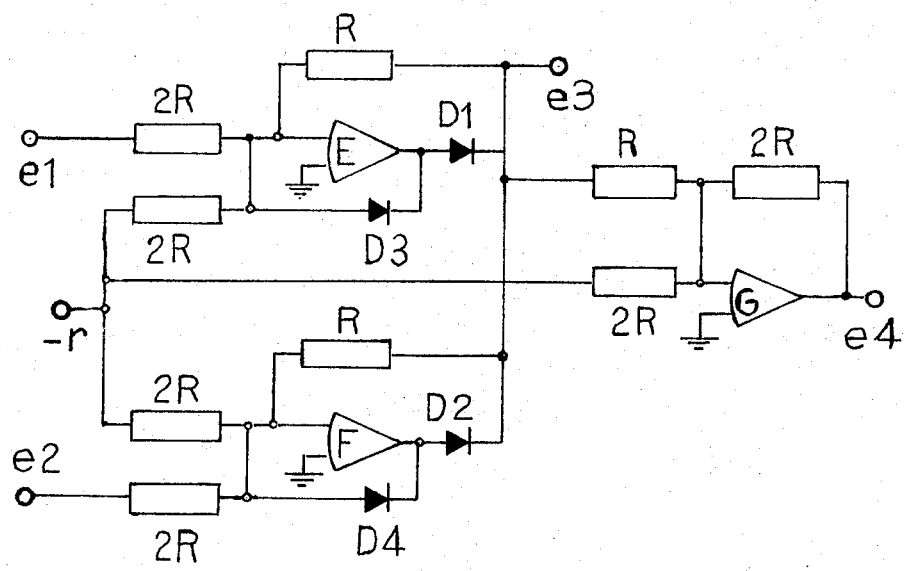
FIG. 11 is a circuit diagram of a maximum selector.

In FIG. 11 is shown a circuit diagram for the minimum selector min. The signals of the inverting maximum followers (or minimum followers) are at the inputs $e1$ and $e2$. One does not need the voltage $-r$, if one of the signals at $e1$ or $e2$ is negative. The diodes D1 and D2 cause a signal at $e3$, which is equal to the inverted value of the most negative value of $e1$ and $e2$. Consequently $e3$ is the inverted output of the minimum selector. The operational amplifiers E and F provide that the voltage drop over the diodes D1 and D2 has no influence on the signal $e3$. When both signals $e1$ and $e2$ become positive, an additional negative signal $-r$ is necessary in order to keep $e3$ positive. The additional signal $-r$ is compensated at the summing junction at the inverting input of the operational amplifier G. The readout of the minimum selector is at $e4$. The diodes D3 and D4 are only necessary, when the saturation situation of the operational amplifiers E and F is not allowed. The indicated values of the resistors in FIG. 11 is only an example with amplification one. Other values, which give a built in amplification $\neq 1$ of the signal $e1$ respectively $e2$ are possible. A maximum selector is obtained by inverting the diodes D1 to D4 inclusive and changing the signal $-r$ into $+r$. The described maximum selector may be valuable not only in an apparatus for defining the envelopes but also for other electronic equipment.

Figure 12:
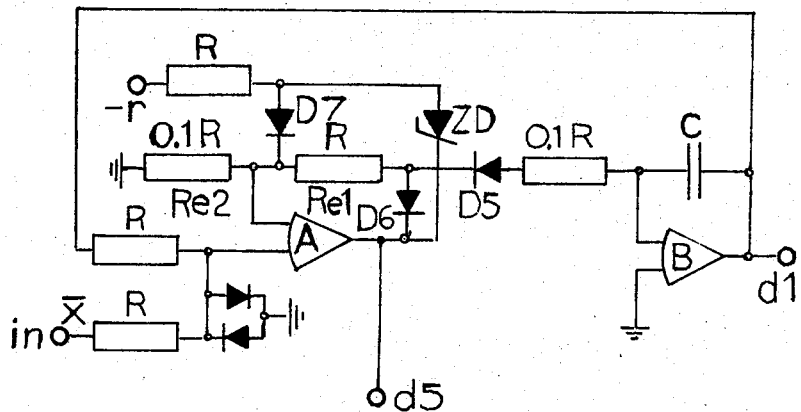
FIG. 12 is a circuit diagram of a maximum follower with an incorporated maximum detector.

In FIG. 12 is shown a maximum follower with an incorporated maximum detector. The maximum follower consists of a capacitor C with buffer amplifier B, which is charged over the diode D5 by the output of the comparator formed by the operational amplifier A, which compares the signal $d1$ over the capacitor C with the varying input signal $x$. The signal $d1$ is the read-out of the maximum follower. As long as the sum of the signals $d1$ and $\overline{x}$ is negative the feedback circuit formed by the diode D6 and the resistors $Re1$ and $Re2$ provides a stable charging process of the capacitor C without overshoot, but when the peak value of $x$ is reached, the sum of $d1$ and $\overline{x}$ becomes positive and the diode D6 prevents any current from flowing through the feed back circuit. Now the signal $d5$ changes from a negative value to a high level positive value, determined by the zener voltage of the zener diode ZD, the signal $d5$ being the read-out of the maximum detector. The indicated values of the resistors in FIG. 12 are only examples. Other values are possible. A further stability of the charging process may be obtained with suitable capacitors parallel to the resistors.

The apparatus described by the invention was applied succesfully in a measuring device for the optical transfer function. In this device a lens under test depicts a line pattern with varying line frequency, the frequency changing considerably over a few lines. A slit with a photo detector scans the image of the line pattern. The modulation depth of the photo detector signal is a measure for the optical transfer function. This modulation depth was defined by the apparatus of the present invention and plotted on a recorder. The apparatus of the invention may be a general accessory to recorders and plotters.

What is claimed is:

1. An apparatus for measuring continually mathematical combinations of the extremities (= of the maxima and/or minima) of a varying input signal comprising:
   a. extremities following means adapted to receive the varying input signal for following the varying input signal till an extremity is reached and holding this extremity value at its output, and having a reset mode for resetting its output to an initial value and a logic input for receiving logic signals for switching on and off the reset mode;
   b. memory means coupled to the output of the extremities following means (a) for storing the extremities and for providing the mathematical combination of the extremities at its output, the said output of the memory means being the read-out of the apparatus;

c. extremities detection means adapted to receive the varying input signal for providing logic signals at its output when the varying input signal has passed an extremity; and d. logic circuit means coupled to the output of the extremities detection means (c) for switching the extremities following means (a) to its reset mode after the storage of the measured extremity value in the memory means (b) and for releasing the extremities following means (a) from the reset mode after the extremities detection means (c) has detected the last extremity previous to the next extremity to be measured by the extremities following means (a).

2. An apparatus in accordance with claim 1 wherein the mathematical combination of the extremities to be measured continually is the value of one of the two types of extremities, maximum or minimum; the extremities of the type to be measured are called extremity I and the extremities of the other type are called extremity II;

the extremities following means (a) including extremity I following means for following the varying input signal till an extremity I is reached and for holding this extremity I, the extremity I following means having a reset mode for resetting its output to an initial value and a logic input for receiving logic signals for switching on and off the reset mode;

the memory means (b) including sample/hold circuit means coupled to the output of the extremity I following means for storing the extremity I;

the extremities detection means (c) including extremity II detection means for providing a logic signal when the varying input signal has passed an extremity II; and the logic circuit means (d) including means coupled to the output of the extremity II detection means for giving the following logic signals after the extremity II detection means has detected an extremity II: a first logic pulse signal to the sample/hold circuit means, the leading edge of the first pulse switching the sample/hold circuit means from the hold mode to the sample mode and the trailing edge of the first pulse switching the sample/hold circuit means back to the hold mode, and a second pulse signal to the extremity I following means after the first pulse signal has ended, the leading edge of the second pulse switching the extremity I following means to the reset mode and the trailing edge of the second pulse releasing the extremity I following means from the reset mode.

3. An apparatus in accordance with claim 1, wherein the mathematical combination of the extremities to be measured continually is the value of one of the two types of extremities, maximum or minimum; the extremities of the type to be measured are called extremity I and the extremities of the other type are called extremity II;

the extremities following means (a) including extremity I following means for following the varying input signal till an extremity I is reached and for holding this extremity I, the extremity I following means having a reset mode for resetting its output to an initial value and a logic input for receiving logic signals for switching on and off the reset mode;

the memory means (b) including sample/hold circuit means coupled to the output of the extremity I following means for storing the extremity I;

the extremities detection means (c) including extremity II detection means for providing a logic signal when the varying input signal has passed an extremity II, and extremity I detection means for providing a logic signal when the varying input signal has passed an extremity I; and the logic circuit means (d) including means coupled to the outputs of the extremity II detection means and the extremity I detection means for giving a logic pulse signal to the sample/hold circuit means after the extremity I detection means has detected an extremity I, the leading edge of the pulse switching the sample/hold circuit means from the hold mode to the sample mode and the trailing edge ofthe pulse switching the sample/hold circuit means back to the hold of the and for giving a logic pulse signal to the extremity I following means after the extremity II detection means has detected an extremity II, the leading edge of the pulse switching the extremity I following means to the reset mode and the trailing edge of the pulse releasing the extremity I following means from the reset mode.

4. An apparatus in accordance with claim 1, wherein the mathematical combination of the extremities to be measured continually is the value of one of the two types of extremities, maximum or minimum; the extremities of the type to be measured are called extremity I and the extremities of the other type are called extremity II;

the extremities following means (a) including extremity I following means for following the varying input signal till an extremity I is reached and for holding this extremity I, the extremity I following means having a reset mode for resetting its output to an initial value and a logic input for receiving logic signals for switching on and off the reset mode;

the memory means (b) including sample/hold circuit means coupled to the output of the extremity I following means for storing the extremity I;

the extremities detection means (c) including extremity II detection means for providing a logic signal, when the varying input signal has passed an extremity II, and extremity I detection means for providing a logic signal when the varying input signal has passed an extremity I; and the logic circuit means (d) including means coupled to the outputs of the extremity II detection means and the extremity I detection means for giving the following logic signals after the extremity I detection means has detected an extremity I: a logic pulse signal to the sample/hold circuit means, the leading edge of the pulse switching the sample/hold circuit means from the hold mode to the sample mode and the trailing edge of the pulse switching the sample/hold circuit means back to the hold mode, and a logic signal switching the extremity I following means to the reset mode after the pulse signal has ended; and for giving a logic signal for releasing the extremity I following means from the reset mode after the extremity II detection means has detected an extremity II.

5. An apparatus in accordance with claim 1 wherein the mathematical combination of the extremities to be measured continually is the value of one of the two types of extremities, maximum or minimum; the extremities of the type to be measured are called extremity I and the extremities of the other type are called extremity II;

the extremities following means (a) including alternately one of two extremity I following means for following the varying input signal till an extremity I is reached and for holding this extremity I, the two extremity I following means having separate reset modes for resetting each output to an initial value and separate logic inputs for switching on and off the reset mode; and the memory means (b) including alternately one of the two extremity I following means for storing an extremity I during the time of the cycle wherein an extremity I following means is not used for following the varying input signal, and including extremity I selection means for choosing the most extreme value from the output values of the two exremity I following means, the output of the extremity I selection means being the read-out of the apparatus.

6. An apparatus in accordance with claim 2 wherein: the extremities detection means (c) includes extremity II detection means for providing a logic signal when the varying input signal has passed an extremity II; and the logic circuit means (d) including means coupled to the output of the extremity II detection means for giving a logic pulse signal to the first extremity I detection means after the extremity II detection means has detected an extremity II, the leading edge of the pulse switching the first extremity I following means to the reset mode and the trailing edge of the pulse releasing the first extremity I following means from the reset mode, and for giving a logic pulse signal to the second extremity I detection means after the extremity II detection means has detected the next extremity II, the leading edge of the pulse switching the second extremity I following means to the reset mode and the trailing edge of the pulse releasing the second extremity I following means from the reset mode.

7. An apparatus in accordance with claim 1 wherein:

the extremities detection means (c) includes extremity II detection means for providing a logic signal when the varying input signal has passed an extremity II, and extremity I detection means for providing a logic signal when the varying input signal has passed an extremity I; and the logic circuit means (d) includes means coupled to the outputs of the extremity II detection means and the extremity I detection means for giving a logic signal for switching on the reset mode of the first extremity I following means after the extremity I detection means has detected an extremity I, for giving a logic signal for releasing the first extremity I following means from the reset mode after the extremity II detection means has detected the extremity II, which follows after the detected extremity I, for giving a logic signal for switching on the reset mode of the second extremity I following means after the extremity I detection means has detected the next extremity I, and for giving a logic signal for releasing the second extremity I following means from the rest mode after the extremity II detection means has detected the next extremity II.

8. An apparatus in accordance with claim 1 wherein the mathematical combinations of the extremities to be measured continually are the maximum value and the minimum value, the extremities following means (a) including maximum following means for following the varying input signal till a maximum is reached and for holding this maximum, the maximum following means having a reset mode for resetting its output to an initial value and a logic input for receiving logic signals for switching on and off the reset mode, and including minimum following means for following the varying input signal till a minimum is reached and for holding this minimum, the minimum following means having a reset mode for resetting its output to an initial value and a logic input for receiving logic signals for switching on and off the reset mode;

the memory means (b) including a first sample/hold circuit means coupled to the output of the maximum following means for storing the maximum and a second sample/hold means coupled to the output of the minimum following means for storing the minimum;

the extremities detection means (c) including maximum detection means for providing a logic signal when the varying input signal has passed a maximum, and including minimum detection means for providing a logic signal when the varying input signal has passed a minimum; and the logic circuit means (d) including means coupled to the ouputs of the maximum detection means and the minimum detection means for giving the following logic signals after the maximum detection means has detected a maximum: a logic pulse signal to the first sample/hold circuit means, the leading edge of the pulse switching the first sample/hold circuit means from the hold mode to the sample mode and the trailing edge of the pulse switching the first sample/hold circuit means back to the hold mode, a logic signal switching the maximum following means to the reset mode after the pulse signal has ended, and a logic signal releasing the minimum following means from the reset mode, and for giving the following logic signals after the minimum detection means has detected a minimum: a logic pulse signal to the second sample/hold circuit means, the leading edge of the pulse switching the second sample/hold circuit means from the hold mode to the sample mode and the trailing edge of the pulse switching the second sample/hold circuit means back to the hold mode, a logic signal switching the minimum following means to the reset mode after the pulse signal has ended, and a logic signal releasing the maximum following means from the reset mode.

9. An apparatus in accordance with claim 1 wherein the mathematical combinations of the extremities to be measured continually are the maximum value and the minimum value, the extremities following means (a) including alternately one of two maximum following means for following the varying input signal till a maximum is reached and for holding this maximum, the two maximum following means having separate reset modes for resetting each output to an initial value and separate logic inputs for switching on and off the reset mode, and including alternately one of two minimum following means for following the varying input signal till a minimum is reached and for holding this minimum, the two minimum following means having separate reset modes for resetting each output to an initial value and separate logic inputs for switching on and off the reset mode;

the memory means (b) including alternately one of the two maximum following means for storing a maximum during the time of the cycle wherein a maximum following means is not used for following the varying input signal, including maximum selection means for choosing the highest value from the output values of the two maximum following means, including alternately one of the two minimum following means for storing a minimum during the time of the cycle wherein a minimum following means is not used for following the varying input signal, and including minimum selection means for choosing the lowest value from the output values of the two minimum following means, the outputs of the maximum selection and the minimum selection means being the read-out of the apparatus;

the extremities detection means (c) including maximum detection means for providing a logic signal when the varying input signal has passed a maximum, and including minimum detection means for providing a logic signal when the varying input signal has passed a minimum; and the logic circuits means (d) including means coupled to the outputs of the maximum detection means and the minimum detection means for giving a logic signal for switching on the reset mode of the first maximum following means and a logic signal for releasing the first minimum following means from the reset mode after the maximum detection means has detected a maximum, for giving a logic signal for switching on the reset mode of the second minimum following means and a logic signal for releasing the first maximum following means from the reset mode after the minimum detection means has detected the minimum, which follows after the detected maximum, for giving a logic signal for switching on the reset mode of the second maximum following means and a logic signal for releasing the second minimum following means from the reset mode after the maximum detection means has detected the next maximum, and for giving a logic signal for switching on the reset mode of the first minimum following means and a logic signal for releasing the second maximum following means from the reset mode after the minimum detection means has detected the next minimum.

10. An apparatus in accordance with claim 1 wherein the mathematical combination of the extremities to be measured continually is a combination of the values of both types of extremities, maximum and minimum; the extremities of one type are called extremity I and the extremities of the other type are called extremity II, the extremities following means (a) including extremity I following means for following the varying input signal till an extremity I is reached and for holding this extremity I, the extremity I following means having a reset mode for resetting its output to an initial value and a logic input for receiving logic signals for switching on and off the reset mode, and including extremity II following means for following the varying input signal till an extremity II is reached and for holding this extremity II, the extremity II following means having a reset mode for resetting its output to an initial value and a logic input for receiving logic signals for switching on and off the reset mode;

the memory means (b) including calculating means coupled to the outputs of the extremity I following means and the extremity II following means for forming the mathematical combination of extremity I and extremity II, and including sample/hold circuit means coupled to the output of the calculating means for storing the mathematical combination of extremity I and extremity II;

the extremities detection means (c) including extremity I detection means for providing a logic signal when the varying input signal has passed an extremity I, and extremity II detection means for providing a logic signal when the varying input signal has passed an extremity II; and the logic circuit (d) including means coupled to the outputs of the extremity I detection means and the extremity II detection means for giving the following logic signals after the extremity I detection means has detected an extremity I: a first logic pulse signal to the sample/hold circuit means, the leading edge of the first pulse switching the sample/hold circuit means from the hold mode to the sample mode and the trailing edge of the first pulse switching the sample/hold circuit means back to the hold mode, a second logic pulse signal to the extremity II following means after the first pulse signal has ended, the leading edge of the second pulse switching the extremity II following means to the reset mode and the trailing edge of the second pulse releasing the extremity II following means from the reset mode, and a logic signal switching the extremity I following means to the reset mode after the first pulse signal has ended, and for giving a logic signal for releasing the extremity I following means from the reset mode after the extremity II detection means has detected an extremity II.

11. An apparatus in accordance with claim 1 wherein the extremities detection means (c) includes comparing means for comparing the value of the varying input signal with the value at the output of extremity following means, which follows the varying input signal till an extremity is reached and which holds this extremity value, the comparing means giving different logic signals when the output of the extremity following means is equal to or less extreme than the input signal and when the output of the extremity following means exceeds the varying input signal.

12. An apparatus in accordance with claim 11 wherein the comparing means includes adjustable positive feed back means from the output to the input of the comparing means for eliminating the influence of noise.

13. An apparatus in accordance with claim 1 wherein the extremities following means (a) includes a capacitor, which is charged over a diode by the output of comparing means for comparing the signal over the capacitor with the varying input signal, the comparing means having feed back circuit means for insuring that the signal over the capacitor follows the varying input signal in a stable manner without overschoot as long as the capacitor has to be charged, the feed back circuit means including a diode for preventing any current through the feed back circuit when the extremity value is reached by the varying input signal, whereupon the comparing means gives its normal high level signal; and wherein the extremities detecting means (c) includes the said comparing means, the said high level signal being the logic signal for indicating that an extremity has passed.

14. An apparatus in accordance with claim 1 wherein the extremities detection means (c) includes comparing means adapted to be coupled to the varying input signal and to a predetermined signal value for giving a logic signal when the varying input signal passes the predetermined signal value.

15. An apparatus in accordance with claim 14 and including low pass filter means adapted to be coupled to the varying input signal for supplying the said predetermined signal value.

16. An apparatus in accordance with claim 5 wherein the extremity I selection means includes two operational amplifiers for receiving the output signals from the two extremity I following means and two diodes placed in series, in contrary direction, between the outputs of the two operational amplifiers, the output of the extremity I selection means being between the two diodes, and the said output being connected with the negative inputs of the two operational amplifiers by two resistors.

17. An apparatus in accordance with claim 9 wherein the maximum selection means includes two operational amplifiers for receiving the output signals from the two maximum following means and two diodes placed in series, in contrary direction, between the outputs of the two operational amplifiers, the output of the maximum selection means being between the two diodes, and the said output being connected with the negative inputs of the two operational amplifiers by two resistors; and wherein the minimum selection means includes two operational amplifiers for receiving the output signals from the two minimum following means and two diodes placed in series, in contrary direction, between the outputs of the two operational amplifiers, the output of the minimum selection means being between the two diodes, and the said output being connected with the negative inputs of the two operational amplifiers by two resistors.

* * * * *